US012662089B2

(12) United States Patent
Laney

(10) Patent No.: US 12,662,089 B2
(45) Date of Patent: Jun. 23, 2026

(54) CAR WASH SYSTEM

(71) Applicant: MODULAR NATIONAL CLEANING PTY LTD, Leopold (AU)

(72) Inventor: Denis John Laney, Leopold (AU)

(73) Assignee: MODULAR NATIONAL CLEANING PTY LTD, Leopold (AU)

( * ) Notice: Subject to any disclaimer, the term of this patent is extended or adjusted under 35 U.S.C. 154(b) by 333 days.

(21) Appl. No.: 18/034,291

(22) PCT Filed: Oct. 6, 2022

(86) PCT No.: PCT/AU2022/051195
§ 371 (c)(1),
(2) Date: Apr. 27, 2023

(87) PCT Pub. No.: WO2023/108192
PCT Pub. Date: Jun. 22, 2023

(65) Prior Publication Data
US 2024/0336235 A1 Oct. 10, 2024

(30) Foreign Application Priority Data
Dec. 16, 2021 (AU) ................................ 2021904089

(51) Int. Cl.
*B60S 3/04* (2006.01)
*G01S 17/89* (2020.01)
(52) U.S. Cl.
CPC ................. *B60S 3/04* (2013.01); *G01S 17/89* (2013.01)
(58) Field of Classification Search
CPC .................................... B60S 3/04; G01S 17/89
See application file for complete search history.

(56) References Cited

U.S. PATENT DOCUMENTS

2002/0117193 A1* 8/2002 Anderson ................. B60S 3/04
134/123
2019/0084531 A1* 3/2019 Detrick ..................... B60S 3/06
(Continued)

FOREIGN PATENT DOCUMENTS

AU 2020230916 A1 9/2021
CN 109605390 A 4/2019
(Continued)

OTHER PUBLICATIONS

Authorized Officer: Amanda Bond, International Search Report and Written Opinion issued in PCT application No. PCT/AU2022/051195, Nov. 25, 2022, 14 pp.

*Primary Examiner* — Miranda M Huang
(74) *Attorney, Agent, or Firm* — Kaplan Breyer Schwarz, LLP

(57) ABSTRACT

The present invention relates to car wash systems. The car wash system (10) is a bay-type carwash wherein the vehicle (12) remains stationary within the bay. The frame (14) with washing equipment attached thereto, moves relative to the vehicle (12) to allow the washing equipment to apply cleaning products, perform cleaning actions and spray water on surfaces of the vehicle (12). The mapping system may comprise one or more LIDAR sensors for at least partially mapping surfaces of the vehicle (12). For the example embodiment shown, a front LIDAR sensor (20) is used to map forward facing surfaces of the vehicle (12) and a rear LIDAR sensor (22) is used to map rearward facing surfaces of the vehicle (12). The mapped information is sent to the controller.

7 Claims, 4 Drawing Sheets

(56)  References Cited

U.S. PATENT DOCUMENTS

2019/0256056 A1 *  8/2019  Kim ........................ G06T 17/00
2020/0282958 A1 *  9/2020  Stephenson ............ G06V 20/00

FOREIGN PATENT DOCUMENTS

CN          208760582 U      4/2019
CN          213676617 U      7/2021

* cited by examiner

CAR WASH SYSTEM

FIELD OF THE INVENTION

The present invention relates to car wash systems.

The invention has been developed primarily for use with bay-type car wash systems and will be described hereinafter with reference to this application. However, it will be appreciated that the invention is not limited to this particular field with possible applications in fields such as, for example, tunnel- or conveyor-type car wash systems.

BACKGROUND OF THE INVENTION

Automatic car wash systems are convenient as they allow a vehicle to be cleaned with minimal human effort. These automatic systems are typically also much faster than one or two cleaning a vehicle manually.

The efficiency of an automatic car wash system can be determined by weighing factors such as the end result of the cleaning process—in other words, how clean the vehicle is—and the amount of cleaning products and water used, against the time taken to clean the vehicle.

Further, many existing car wash systems have sensors mounted on a frame supporting washing equipment or on the washing equipment itself. While this may have an advantage in more accurately determining distances between the cleaning equipment and the vehicle, with these arrangements the position and profile of the vehicle can typically only be calculated once the frame and washing equipment has passed over the outer surfaces of the vehicle at least once, which can be time consuming. Further, sensors mounted on the washing equipment are exposed to large amount of moisture and need to be designed to operate in relatively harsh environments.

It can therefore be seen that there are a number of variables that can be optimised to improve the overall efficiency of a car wash system. These factors include, but are not limited to:

a) the time taken to clean a vehicle;

b) amount of cleaning products used during the cleaning process;

c) amount of water used; and d) the quality of the end result of the clean.

Most importantly, these variables must be improved upon while maintaining and complying with built in safety measures to ensure that the vehicle is not damaged during the cleaning process.

The present invention seeks to provide an automatic car wash system, which will improve upon, overcome or substantially ameliorate at least one or more of the deficiencies of the prior art, or to at least provide an alternative.

It is to be understood that, if any prior art information is referred to herein, such reference does not constitute an admission that the information forms part of the common general knowledge in the art, in Australia or any other country.

SUMMARY

According to one aspect there is provided, a car wash system for washing a vehicle, the system comprising:

a frame with washing equipment attached thereto, wherein a vehicle being washed and the frame are configured to move relative to each other to change the relative position of the washing equipment and the vehicle;

a driver for driving relative movement between the vehicle and the frame;

a mapping system for at least partially mapping a surface of the vehicle;

a controller configured to:

determine the relative position of the washing equipment and the vehicle based on the mapping of the surface of the vehicle, and control the driver to position the washing equipment relative to the vehicle based on the calculated relative position; and wherein the vehicle can be cleaned by changing the relative position of the washing equipment based on the map of the surface.

The mapping system may comprise sensors mounted remote from the frame and the washing equipment. The mapping system may comprise one or more LIDAR sensors. The one or more LIDAR sensors may comprise a front LIDAR sensor for mapping forward facing surfaces of the vehicle and a rear LIDAR sensor for mapping rearward facing surfaces of the vehicle.

It can be seen that the system provides the benefit of using sensors that are remote from the washing equipment and therefore do not need to operate in close proximity to the vehicle. The system provides the further benefit that, by using the mapping system, the position of the vehicle and the dimensions of the vehicle can be determined near instantaneously without moving the frame or cleaning equipment. Appreciably this may shorten the time taken to clean the vehicle.

The car wash system may be a bay-type system wherein the vehicle remains stationary within a bay and the drive system moves the frame to change the position of the washing equipment relative to the vehicle. The frame may comprise a truck traveling on a track, wherein washing equipment is attached to the truck; and wherein the drive system drives movement on of the truck on the track to change the position of the washing equipment relative to the vehicle. The truck may comprise at least one swing arm with the washing equipment attached thereto to allow the washing equipment to pivot around corners of the vehicle.

The controller may determine an extrapolated profile of the vehicle based on the partial mapping of the surface.

The system can more accurately determine the position and dimensions of the vehicle such that the relative position of the cleaning equipment can be more calculated more accurately. This can provide the benefit that the position of the cleaning equipment relative to the vehicle can be controlled more accurately, to, for example, provide a more intensive wash, or to limit wastage when applying cleaning materials and water. This may also allow the system to use less cleaning materials and water to provide the same level of cleaning.

According to a further aspect, there is provided an automated method of washing a vehicle, the method comprising the steps of:

providing a frame with washing equipment attached thereto, wherein the vehicle and the frame are configured to move relative to each other to change the relative position of the washing equipment and the vehicle;

providing a drive system for driving relative movement between the vehicle and the frame;

electronically mapping at least part of an outer surface of the vehicle;

determining, using a controller, the relative position of the washing equipment and the vehicle based on the mapping of the outer surface of the vehicle; and changing, by controlling the drive system, the position of the washing equipment relative to the vehicle based on the calculated relative position.

The step of electronically mapping at least part of an outer surface of the vehicle may comprise using sensors mounted remote from the frame and the washing equipment, and performing the mapping prior to changing the position of the washing equipment relative to the vehicle.

The step of electronically mapping at least part of an outer surface of the vehicle comprises using one or more LIDAR sensors to perform the electronic mapping. The one or more LIDAR sensors may comprise using a front LIDAR sensor to map forward facing surfaces of the vehicle and using a rear LIDAR sensor to map rearward facing surfaces of the vehicle.

The method may comprise the step of determining, using the controller, an extrapolated profile of the vehicle based on the partial mapping of the surface.

Other aspects of the invention are also disclosed.

BRIEF DESCRIPTION OF THE DRAWINGS

Notwithstanding any other forms which may fall within the scope of the present invention, embodiments will now be described, by way of example only, with reference to the accompanying drawings in which.

DETAILED DESCRIPTION

Figure 1:
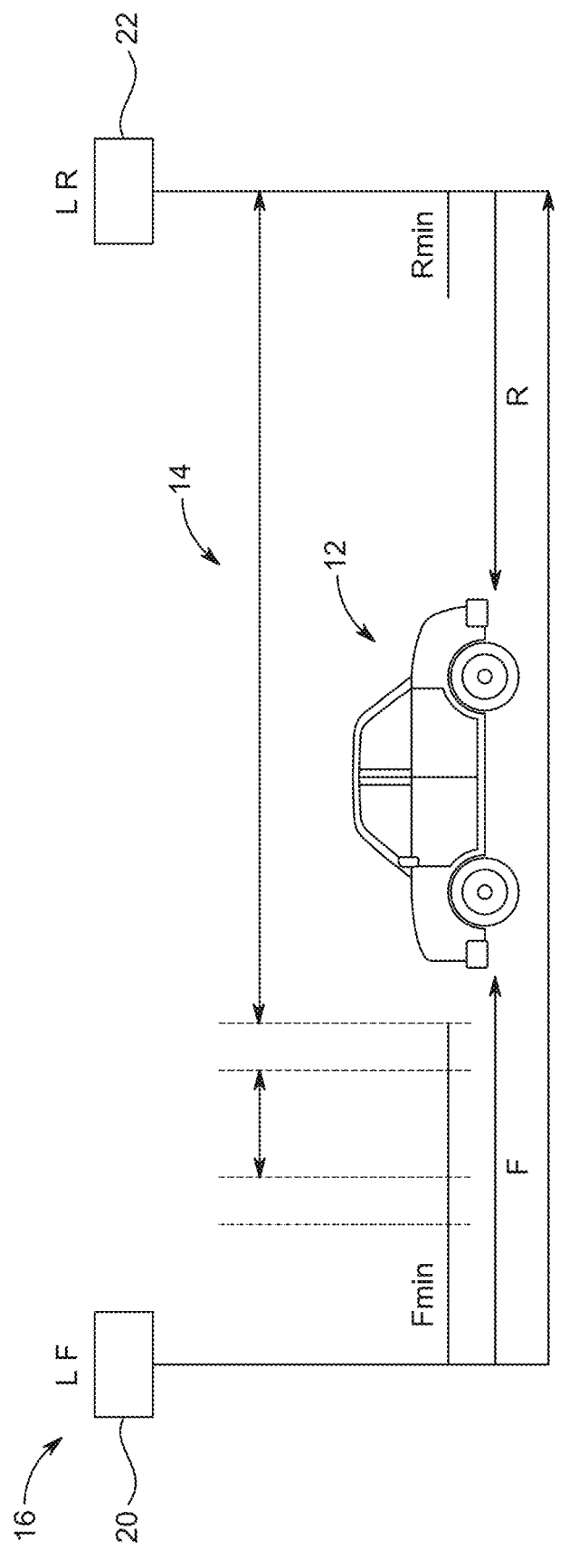
FIGS. 1 to 3 are schematic diagrams of a car wash system in accordance with some embodiments of the present invention.

Referring now to the drawings, a car wash system, in accordance with some embodiments is generally indicated by reference numeral 10. The car wash system 10 for washing a vehicle 12 comprises a frame 14 with washing equipment (not shown) attached thereto. The vehicle 12 being washed and frame 14 are configured to move relative to each other to change the relative position of the washing equipment and the vehicle 12. To facilitate relative movement between the vehicle 12 and the frame 14 the car wash system 10 further comprises a driver (not shown) to drive movement of either or both the vehicle 12 and the frame 14.

The car wash system 10 also comprises a mapping system 16 for at least partially mapping a surface of the vehicle 12. The mapping system 16 provides information of the mapped surface to a controller 18 configured to determine the relative position of the washing equipment and the vehicle 12 based on the mapping of the surface of the vehicle 12. The controller 18 is further configured to control the driver to position the washing equipment relative to the vehicle based on the calculated relative position.

For the example embodiments shown, the car wash system 10 is a bay-type carwash wherein the vehicle 12 remains stationary within the bay. The frame 14 with washing equipment attached thereto, moves relative to the vehicle 12 to allow the washing equipment to apply cleaning products, perform cleaning actions and spray water on surfaces of the vehicle 12. However, it will be appreciated that in some embodiments, the vehicle may be moved relative to the cleaning equipment for instance in a tunnel- or conveyor-type car wash configuration.

The mapping system may comprise one or more LIDAR sensors for at least partially mapping surfaces of the vehicle 12. For the example embodiment shown, a front LIDAR sensor 20 is used to map forward facing surfaces of the vehicle 12 and a rear LIDAR sensor 22 is used to map rearward facing surfaces of the vehicle 12. The mapped information is sent the controller. In turn the size and location of the vehicle within the bay can be determined.

Described with reference to FIG. 1 use of the LIDAR sensors advantageously allows the position of the vehicle 12 within the bay can be calculated before the frame or cleaning equipment moves. For example, the system 10 can determine and indicate whether the vehicle is parked within the operational limits of the frame, in particular, whether any part of the vehicle 12 is too far forward (i.e., within Fmin) or too far back (i.e., within Rmin). Further, the system 10 can determine the location of the front an rear ends of the vehicle to calculate the distances F and R which are the distances of these surfaces from the edges of the bay.

Figure 2:
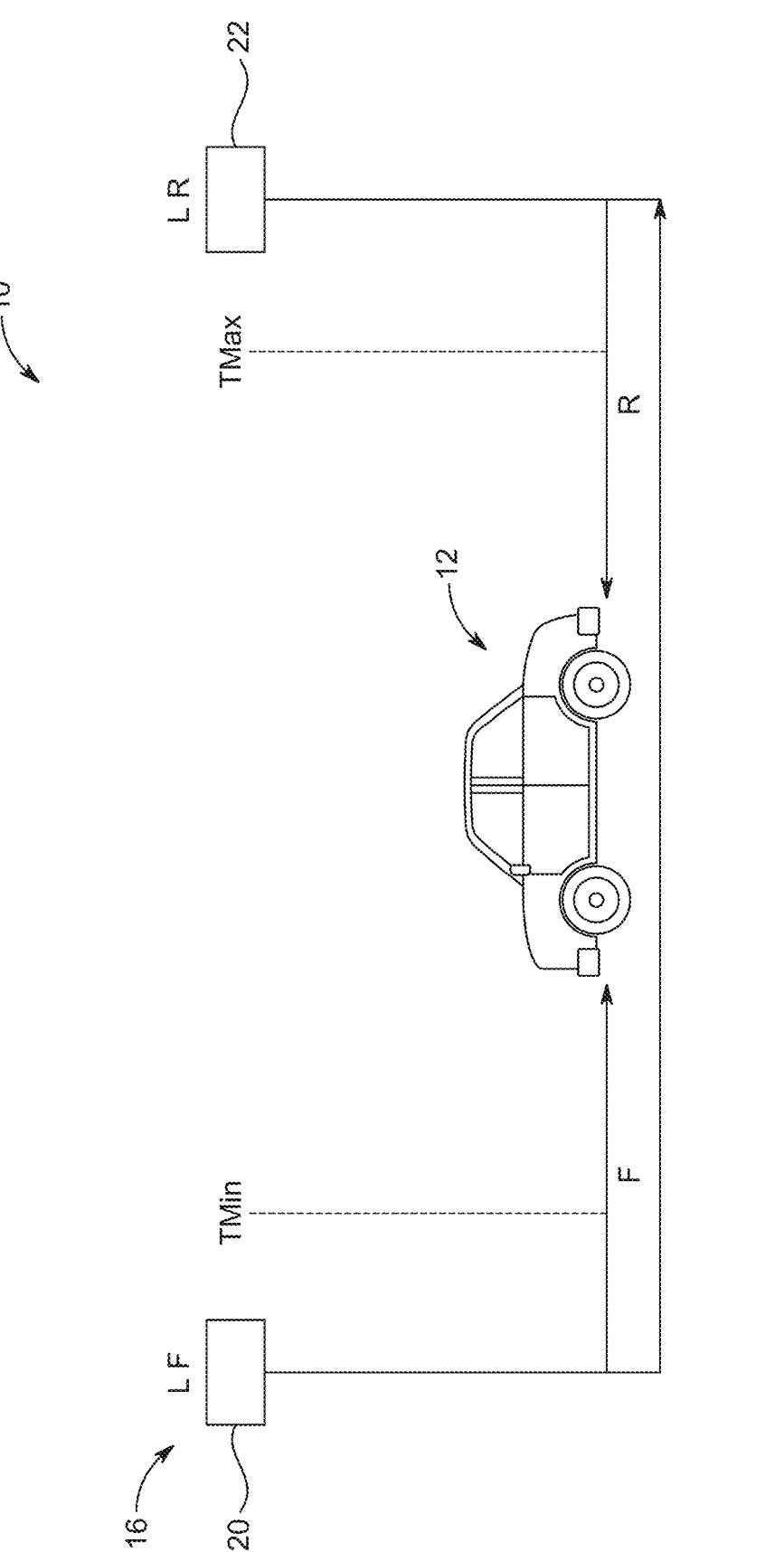
Figure 3:
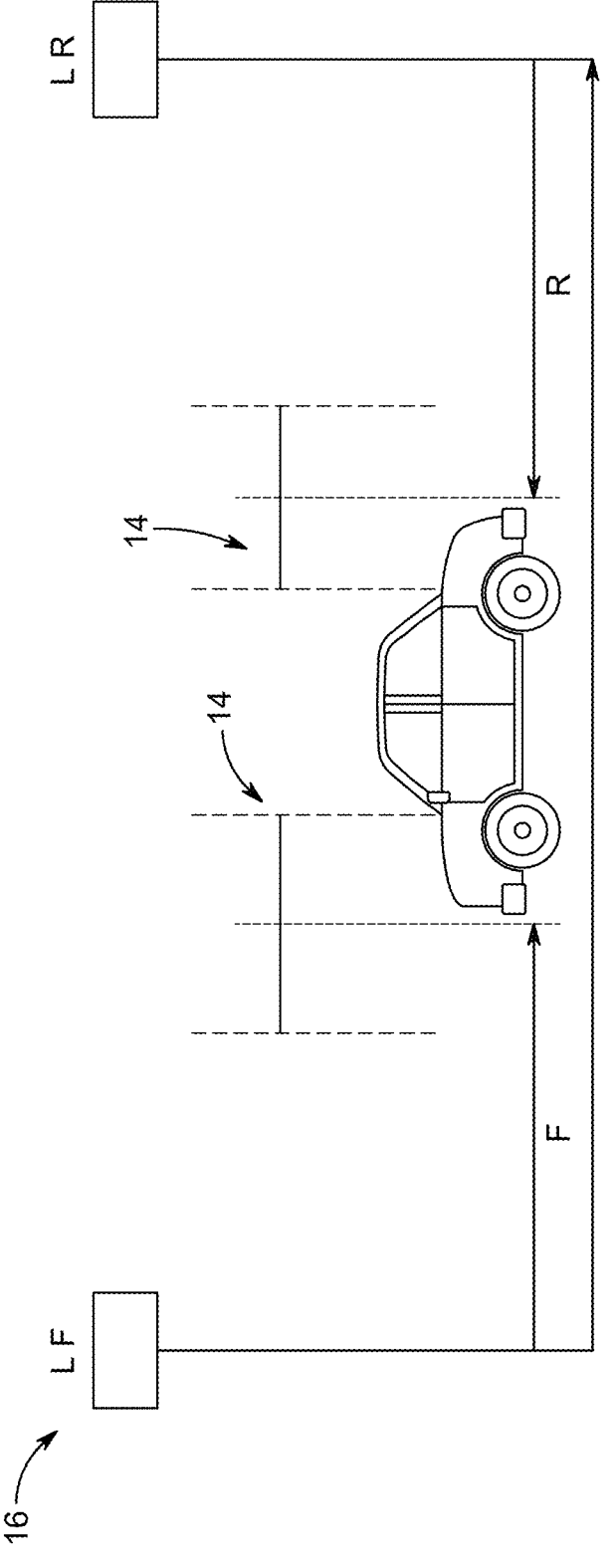
Figure 4:
FIG. 4. is a schematic block flow diagram illustrating the control process.
Figure 4:
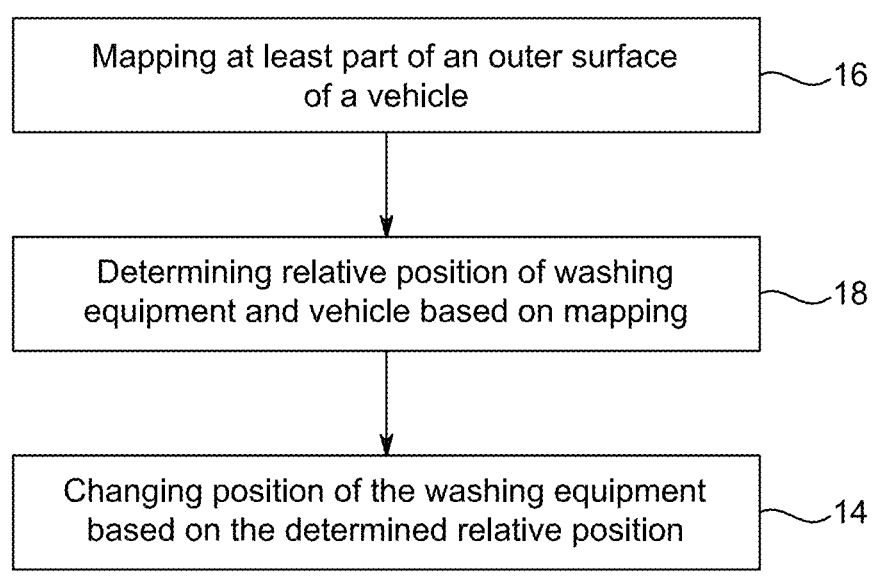

The frame 14 has an operating area as depicted, for example in FIG. 2. The drive system, which may take the form of a motorized drive system, a hydraulic drive system or a pneumatic drive system is configured to move the frame, and associated washing equipment between Tmin and Tmax. If the controller establishes that any part of the vehicle 12 is outside the operating area, an alarm can be generated and the cleaning process can be halted.

The frame 14 may comprise a truck (not shown) travelling on a track, wherein the washing equipment is attached to the truck. The truck may also comprise at least one swing arm (not shown) with the washing equipment attached thereto to allow the washing equipment to pivot around corners of the vehicle 12.

A person skilled in the art will appreciate that the at least one swing arm may be alternatively shaped and configured, for example, the at least one swing arm may be linear, u-shaped, rectangular, or square in shape.

A person skilled in the art will also appreciate that dispensing of any chemical(s), for example, one or more detergent(s), one or more finisher(s), and/or one or more polisher(s), and/or water may take place via one or more dispensing nozzle located on one or more brush.

The information from the mapping system may further be used to extrapolate approximate position and dimensions of the car. For example, the front and rear LIDAR sensors 20, 22 may determine the position of the front and rear ends of the vehicle, as well as the width of the vehicle. The controller may then use this information to extrapolate position of the side surfaces of the vehicle.

Advantageously, having an accurate position of the vehicle, that is established faster, can result in a higher level of clean, using less water and cleaning materials, without compromising on the overall time taken to clean the vehicle.

Interpretation

Embodiments

Reference throughout this specification to "one embodiment" or "an embodiment" means that a particular feature, structure or characteristic described in connection with the embodiment is included in at least one embodiment of the present invention. Thus, appearances of the phrases "in one embodiment" or "in an embodiment" in various places throughout this specification are not necessarily all referring to the same embodiment, but may. Furthermore, the particular features, structures or characteristics may be combined in any suitable manner, as would be apparent to one of ordinary skill in the art from this disclosure, in one or more embodiments.

Similarly it should be appreciated that in the above description of example embodiments of the invention, various features of the invention are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the Detailed Description of Specific Embodiments are hereby expressly incorporated into this Detailed Description of Specific Embodiments, with each claim standing on its own as a separate embodiment of this invention.

Furthermore, while some embodiments described herein include some but not other features included in other embodiments, combinations of features of different embodiments are meant to be within the scope of the invention, and form different embodiments, as would be understood by those in the art. For example, in the following claims, any of the claimed embodiments can be used in any combination.

Different Instances of Objects

As used herein, unless otherwise specified the use of the ordinal adjectives "first", "second", "third", etc., to describe a common object, merely indicate that different instances of like objects are being referred to, and are not intended to imply that the objects so described must be in a given sequence, either temporally, spatially, in ranking, or in any other manner.

Specific Details

In the description provided herein, numerous specific details are set forth. However, it is understood that embodiments of the invention may be practiced without these specific details. In other instances, well-known methods, structures and techniques have not been shown in detail in order not to obscure an understanding of this description.

Terminology

In describing the preferred embodiment of the invention illustrated in the drawings, specific terminology will be resorted to for the sake of clarity. However, the invention is not intended to be limited to the specific terms so selected, and it is to be understood that each specific term includes all technical equivalents which operate in a similar manner to accomplish a similar technical purpose. Terms such as "forward", "rearward", "radially", "peripherally", "upwardly", "downwardly", and the like are used as words of convenience to provide reference points and are not to be construed as limiting terms.

Comprising and Including

In the claims which follow and in the preceding description of the invention, except where the context requires otherwise due to express language or necessary implication, the word "comprise" or variations such as "comprises" or "comprising" are used in an inclusive sense, i.e. to specify the presence of the stated features but not to preclude the presence or addition of further features in various embodiments of the invention.

Any one of the terms: including or which includes or that includes as used herein is also an open term that also means including at least the elements/features that follow the term, but not excluding others. Thus, including is synonymous with and means comprising.

Scope of Invention

Thus, while there has been described what are believed to be the preferred embodiments of the invention, those skilled in the art will recognize that other and further modifications may be made thereto without departing from the spirit of the invention, and it is intended to claim all such changes and modifications as fall within the scope of the invention. For example, any formulas given above are merely representative of procedures that may be used. Functionality may be added or deleted from the block diagrams and operations may be interchanged among functional blocks. Steps may be added or deleted to methods described within the scope of the present invention.

Although the invention has been described with reference to specific examples, it will be appreciated by those skilled in the art that the invention may be embodied in many other forms.

INDUSTRIAL APPLICABILITY

It is apparent from the above, that the arrangements described are applicable to the car wash industry.

The invention claimed is:

1. A car wash system for washing a vehicle, the system comprising:
   a frame with washing equipment attached thereto, wherein a vehicle being washed and the frame are configured to move relative to each other to change the relative position of the washing equipment and the vehicle;
   a driver for driving relative movement between the vehicle and the frame;
   a mapping system for at least partially mapping a surface of the vehicle;
   a controller configured to:
      determine the relative position of the washing equipment and the vehicle based on the mapping of the surface of the vehicle, and
      control the driver to position the washing equipment relative to the vehicle based on the calculated relative position; and
   wherein the vehicle can be cleaned by changing the relative position of the washing equipment based on the map of the surface;
   wherein the mapping system comprises sensors mounted remote from the frame and the washing equipment;
   wherein the mapping system comprises one or more LIDAR sensors; and
   wherein the one or more LIDAR sensors comprises a front LIDAR sensor for mapping forward facing surfaces of the vehicle and a rear LIDAR sensor for mapping rearward facing surfaces of the vehicle.

2. The car wash system as claimed in claim 1 wherein the car wash system is a bay-type system and wherein the vehicle remains stationary within a bay and the drive system moves the frame to change the position of the washing equipment relative to the vehicle.

3. The car wash system as claimed in claim 2 wherein the frame comprises a truck traveling on a track, wherein washing equipment is attached to the truck; and wherein the drive system drives movement on of the truck on the track to change the position of the washing equipment relative to the vehicle.

4. The car wash system as claimed in claim 3 wherein the truck comprises at least one swing arm with the washing equipment attached thereto to allow the washing equipment to pivot around corners of the vehicle.

5. The car wash system as claimed in claim 1 wherein the controller determines an extrapolated profile of the vehicle based on the partial mapping of the surface.

6. An automated method of washing a vehicle, the method comprising the steps of:

providing a frame with washing equipment attached thereto, wherein the vehicle and the frame are configured to move relative to each other to change the relative position of the washing equipment and the vehicle;

providing a drive system for driving relative movement between the vehicle and the frame;

electronically mapping at least part of an outer surface of the vehicle;

determining, using a controller, the relative position of the washing equipment and the vehicle based on the mapping of the outer surface of the vehicle; and changing, by controlling the drive system, the position of the washing equipment relative to the vehicle based on the calculated relative position;

wherein the step of electronically mapping at least part of an outer surface of the vehicle comprises using sensors mounted remote from the frame and the washing equipment, and performing the mapping prior to changing the position of the washing equipment relative to the vehicle;

wherein the step of electronically mapping at least part of an outer surface of the vehicle comprises using one or more LIDAR sensors to perform the electronic mapping; and wherein the using the one or more LIDAR sensors comprises using a front LIDAR sensor to map forward facing surfaces of the vehicle and using a rear LIDAR sensor to map rearward facing surfaces of the vehicle.

7. The method as claimed in claim 6 further comprising the step of determining, using the controller, an extrapolated profile of the vehicle based on the partial mapping of the surface.

\* \* \* \* \*